United States Patent
Brown

(10) Patent No.: US 6,644,739 B2
(45) Date of Patent: Nov. 11, 2003

(54) BABY STROLLER SEAT

(76) Inventor: Judy A. Brown, 20363 E. 44th Ave., Denver, CO (US) 80249

( * ) Notice: Subject to any disclaimer, the term of this patent is extended or adjusted under 35 U.S.C. 154(b) by 0 days.

(21) Appl. No.: 10/087,075

(22) Filed: Mar. 2, 2002

(65) Prior Publication Data
US 2002/0125752 A1 Sep. 12, 2002

Related U.S. Application Data
(60) Provisional application No. 60/272,789, filed on Mar. 5, 2001.

(51) Int. Cl.$^7$ .................................................. A47C 1/08
(52) U.S. Cl. .................... 297/250.1; 297/243; 297/251; 280/47.4
(58) Field of Search ........................ 297/230.1, 230.11, 297/230.12, 230.14, 250.1, 243, 251, 284.5; 280/33.992, 33.993, 47.38, 47.4

(56) References Cited
U.S. PATENT DOCUMENTS

| | | | | |
|---|---|---|---|---|
| 1,408,729 A | * | 3/1922 | Green | |
| 2,499,007 A | * | 2/1950 | Stadelman | |
| 2,769,482 A | * | 11/1956 | Carlson | |
| 2,857,953 A | * | 10/1958 | Berger et al. | |
| 2,993,702 A | * | 7/1961 | Gill | |
| 3,309,101 A | * | 3/1967 | Romay | |
| 3,998,490 A | * | 12/1976 | Lallave | |
| 5,401,076 A | * | 3/1995 | Dunlap | |
| 6,086,152 A | * | 7/2000 | Zeller | |

* cited by examiner

Primary Examiner—Laurie K. Cranmer
(74) Attorney, Agent, or Firm—Thomas W. Hanson

(57) ABSTRACT

A supplemental seat for a baby stroller designed to be releasably attached to the frame and push handle of the stroller, providing additional seating for a second infant. A minimal configuration comprises a seat cushion and seat back attachable to the stroller by means of straps incorporating hook and loop fasteners. Preferably, arm rests are also provided which can also be attached to the stroller frame. Where needed, a removable footrest will be provided. Either or both of the seat cushion and the back rest may comprise two or more cushions joined by webbing or the like.

10 Claims, 2 Drawing Sheets

BABY STROLLER SEAT

CROSS-REFERENCE TO RELATED APPLICATIONS

This application claims the benefit of U.S. Provisional Application No. 60/272,789 filed Mar. 5, 2001.

STATE REGARDING FEDERALLY SPONSORED RESEARCH OR DEVELOPMENT

Not Applicable

BACKGROUND OF THE INVENTION

1. Field of the invention

This version of the invention is concerned with the field of baby strollers. More specifically, this version of the invention is concerned with baby stroller seats that are releasably attached to the frame and rear push handle in order to increase the seating capacity of a baby stroller.

2. Prior Art

A familiar item used to transport infants and small children in public places such as shopping malls is a baby stroller, which is generally constructed of a lightweight, sturdy frame, wheels, seat and auxiliary storage compartments. It is not uncommon, however, for growing families to experience the birth of a subsequent child soon after an earlier child. If a baby stroller with a seating capacity of one was purchased to accommodate the earlier child, it is no longer useful to transport two small children and must be replaced by a stroller with increased seating capacity. The expenditure for a second stroller not long after the purchase of the first stroller can impose an unexpected financial obligation on the family not to mention the problem of storing or disposing of the first stroller.

What is needed then to overcome the aforementioned disadvantages and seating limitations of conventional one seat capacity baby strollers is the provision of a baby stroller seat that can be releasably attached to a frame member and rear push handle of a conventional baby stroller in order to augment the seating capacity of said baby stroller. When the stroller seat is not being used or no longer needed, it can be detached from the baby stroller if necessary and stored until a subsequent need occurs.

3. Discussion of the Prior Art

Numerous designs for baby strollers and seats have been provided in the prior art. Even though these designs may be suitable for the specific individual purposes which they address, they would not be suitable for the purposes of the present version of the invention as such designs are unable to increase, expand, or augment the seating capacity of a conventional baby stroller in a manner that can be accomplished quickly and efficiently and without substantial or permanent modification to said baby stroller. As such, it may be appreciated that there is a continuing need for a new and improved baby stroller seat. In these respects, the present version of the invention substantially departs from the conventional concepts and designs of the prior art, and in so doing provides an apparatus that substantially fulfills this need.

BRIEF SUMMARY OF THE INVENTION

The present version of the invention, which will be described in greater detail hereinafter, relates to the field of baby strollers. More specifically, this version of the invention is concerned with baby stroller seats that are releasably attached to the frame and rear push handle in order to increase the seating capacity of a baby stroller. My version of the invention overcomes the shortcomings listed previously, in addition to novel aspects that will be described in detail hereinafter.

Described briefly, according to a typical embodiment, the invention presents a stroller seat that can be releasably attached to a baby stroller between the seat and rear push handle of the stroller. The inventive stroller seat, which is an assembly of items that can be attached by various means to said stroller, is comprised of a rectangular seat cushion, a seat back, and two arm rests. The seat back further consists of two rectangular cushions that are connected by an intervening sheet of webbing or other type of woven material. Strap fasteners of VELCRO® or the like are attached to the lateral side edges of the rectangular cushions for looping, wrapping, or fastening around a portion of a frame member or rear push handle. The ends of the arm rests are fabricated with apertures that receive fasteners, which in turn are attached or anchored to the rear push handle. As such, the stroller seat is attached to a baby stroller in a configuration whereby the seat cushion is attached by strap fasteners onto a horizontal frame member adjacent to attachment to the rear push handle; the seat back is secured by strap fasteners to the rear push handle, and the arm rests affixed to the rear push handle between the lateral side edges of the seat cushion and seat back. As such, a fully functioning second seat is produced and attached to the baby stroller in order to increase the child or infant carrying capacity of said stroller. When the stroller seat is no longer needed, it can be detached from the baby stroller and placed in storage.

My invention, therefore resides not in any one of these features per se, but rather in the particular combination of all of them herein disclosed. It is distinguished from the prior art in this particular combination of all of its structures for the functions specified.

In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Accordingly, it is an object of my version of the invention to provide a low cost, easy to manufacture, and easy to market baby stroller seat.

A further object of my version of the invention is to provide an easy to use and versatile baby stroller seat.

A significant object of the invention is to provide a baby stroller seat that is comprised of a rectangular seat cushion, seat back, and two arm rests that are releasably attached to a baby stroller between the seat and rear push handle thereof.

A final but very significant object of the invention is to provide a baby stroller seat which increases the seating capacity of a single passenger baby stroller, thereby obviating the need to purchase an additional baby stroller of increased seating capacity, or adapts a stroller of different configuration to provide two forward facing seats.

For a better understanding of the invention, its operating advantages and the specific object attained by its uses, reference should be made to the accompanying drawings and descriptive matter in which there is illustrated a preferred embodiment of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the inventions and the detailed description of the preferred embodiment in addition to the scope of the invention illustrated by the accompanying drawings.

DETAILED DESCRIPTION OF THE INVENTION

The following discussion focuses on the preferred embodiment of the invention, in which the inventive baby stroller seat is shown attached to a stroller originally having one forwardly facing baby seat and one rearwardly facing infant seat. The inventive seat is attached to the stroller in the space occupied by the infant seat. However, as will be recognized by those skilled in the art, the disclosed method and apparatus are applicable to a wide variety of situations in which the addition of supplemental seating to an existing stroller is desired. While a certain amount of available space is required behind the existing seat and in front of the push bar, this exists in a wide variety of strollers whether for a secondary seat, standing room for an infant, storage space, adjustment for the primary seat, or for other purposes. The present invention can be adapted to work with any of these configurations.

Preferred Embodiment

Figure 1:
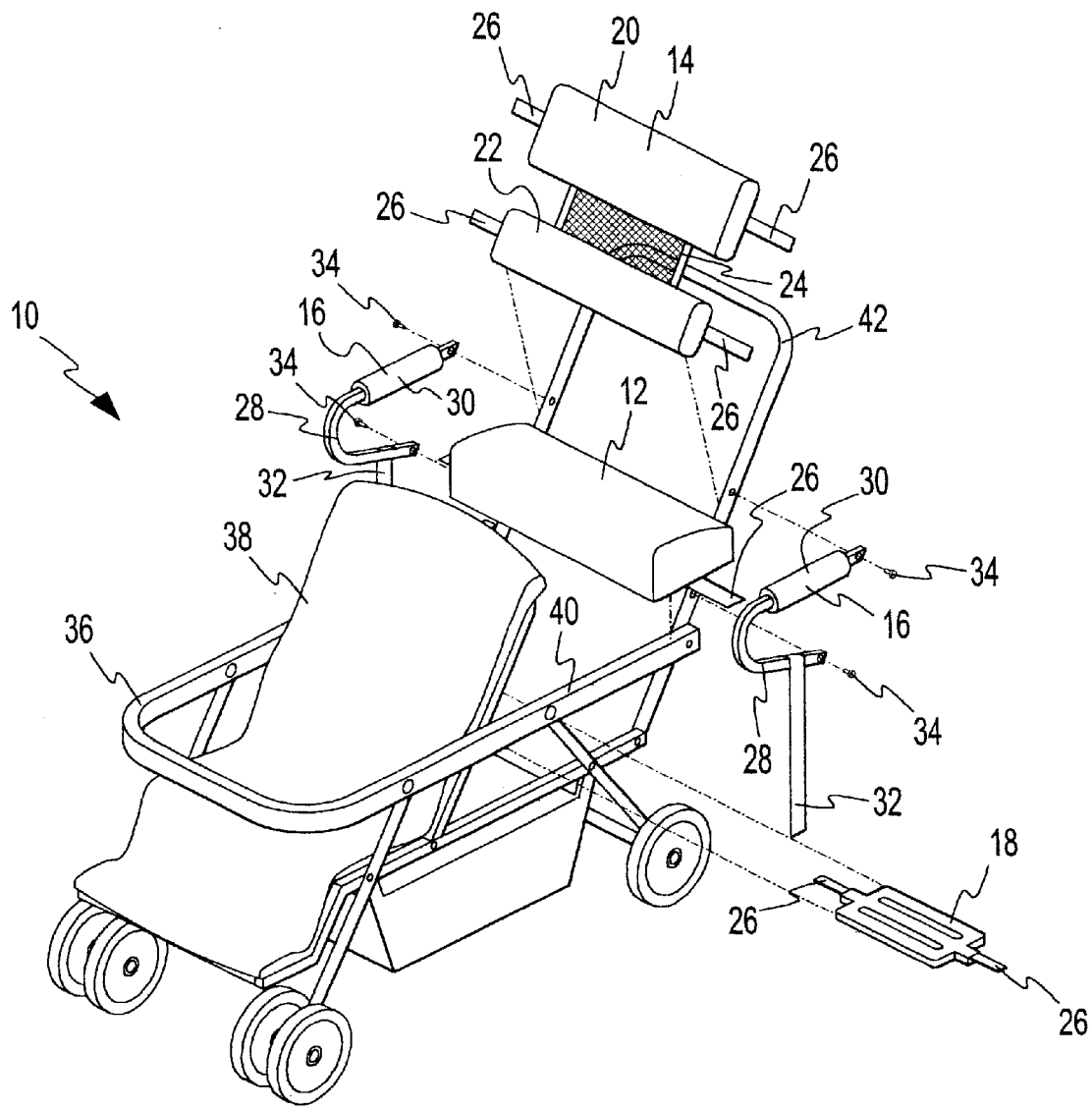
FIG. 1 is an exploded perspective view of a stroller seat in accordance with the present version of the invention aligned for attachment to a baby stroller.

Referring now to the drawings and, in particular, to FIG. 1 wherein there is illustrated a typical embodiment of the inventive baby stroller seat, 10. The present version of the invention is illustrated in exploded view to adequately display the various components thereof. The inventive stroller seat is comprised of a rectangular seat cushion, 12, seat back assembly, 14, and two arm rests, 16. As illustrated, the baby stroller is constructed in part of a seat, 38, horizontal frame member, 40, and rear push handle, 42.

The seat cushion, 12, preferably consists of a single, substantially rectangular cushion adapted to fit closely between the horizontal members of the stroller. Alternatively, it could consist of two or more separate cushions, joined by webbing in a manner similar to the seat back. The seat back assembly consists of a top rectangular cushion, 20, and a lower rectangular cushion, 22, which are attached to each other at facing edges by a sheet of webbing material, 24. Strap fasteners, 26, of VELCRO® or the like are attached to the lateral side edges of all three cushions. The cushions are preferably constructed of a rigid, rear support panel, resilient filling material, and an outer layer or covering that is durable and impervious to liquids.

The use of webbing material has the benefit of allowing some adjustment of the depth of the cushions to match the available space and the needs of the occupant of the seat. Clearly other flexible sheet materials, such as fabric, could also be used. The use of hook and loop fasteners for the cushions offers the alternative of quickly and easily removing the cushions to return the space they occupy to its original intended use.

Each arm rest, 16, is fabricated of a bowed or curved rail, 28, with apertures formed into the rail at two end sections thereof, a cylindrical cushion, 30, and seat belt, 32. Fasteners, 34, are inserted into the apertures of each rail for attachment of the arm rest to a baby stroller. Clearly, the arm rests could also be attached by other means known in the art and could be attached to the seat cushion and/or seat back rather than directly to the frame. Note that the arm rests are not required for the functionality of the inventive seat, and thus could be eliminated, although they may be necessary for safety purposes.

It should be noted that footrest, 18, is a component of some strollers, where it serves as a seat for a rearward facing child. For such a stroller, the footrest need not be supplied. In others, the floor of the stroller is sufficiently high to serve as a footrest. Here also, a footrest need not be supplied. For other baby stroller configurations, the footrest will be supplied and adapted for releasable attachment to the frame of the stroller. The footrest may be either rigid or flexible (such as a fabric or webbing sling) as desired.

Figure 2:
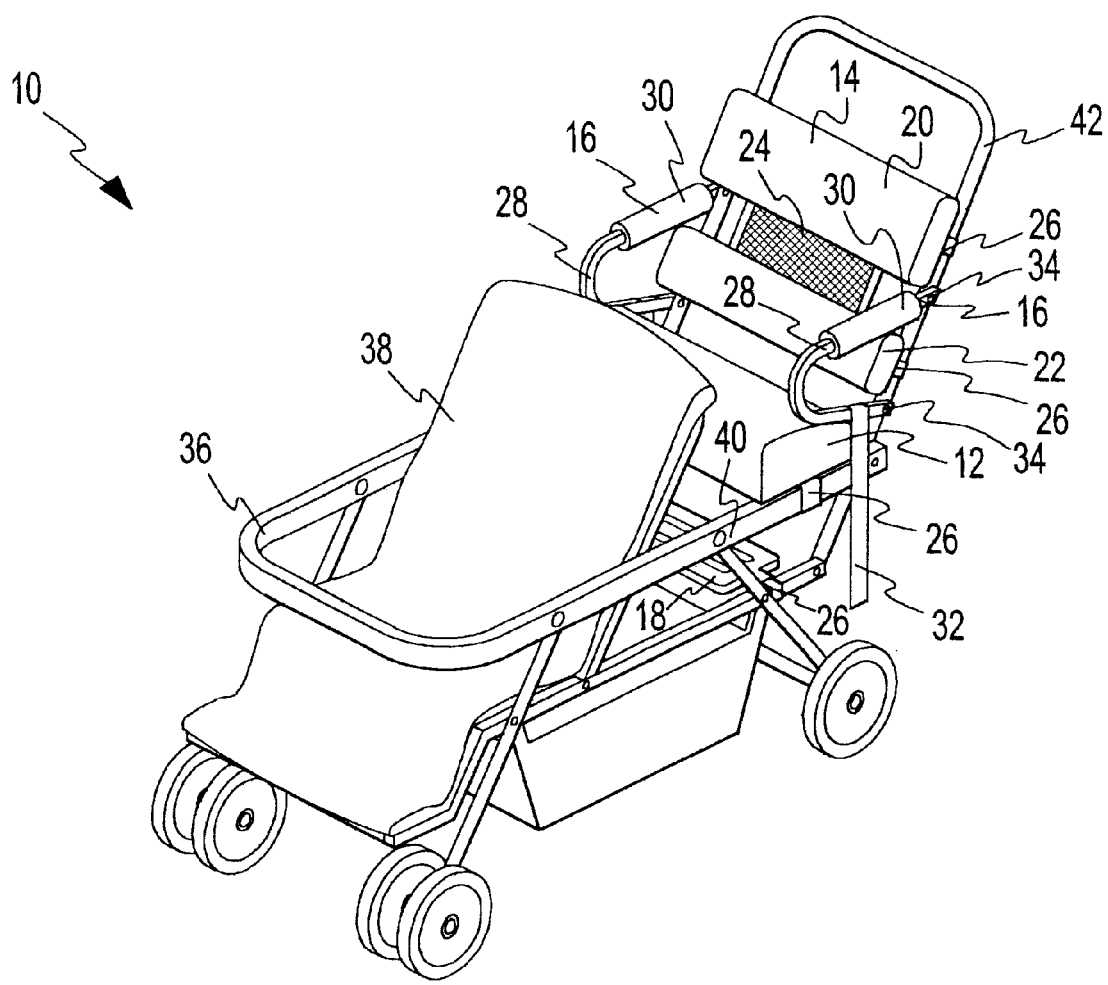
FIG. 2 is a perspective view of a stroller seat attached to a baby stroller in an assembled configuration.

Referring to FIG. 2, therein illustrated is the baby stroller seat, 10, releasably attached to the baby stroller, 36. The seat cushion, 12, is secured onto the horizontal frame member, 40, adjacent to the junction with the rear push handle, 42, by means of the strap fasteners, 26, which are preferably looped, wrapped, or otherwise affixed around the frame member. Preferably, at least a portion of the seat cushion bears on the top surface of the horizontal frame member, but this is not required. Alternatively, one part of the hook and loop fastener could be attached to the frame, such as by adhesive, with the other part of the fastener affixed to the strap, and the two halves mated to secure the cushion. Similarly, the seat back, 14, is releasably affixed to the push handle by the strap fasteners affixed to the top and bottom cushions, these fasteners attached by any of the methods discussed above for the seat cushion. The arm rests, 16, are also attached to the push handle once the fasteners are inserted into the apertures of said arm rests and make threaded or frictional engagement with corresponding apertures of the push handle, 42. Once the baby stroller seat has been secured to the stroller as illustrated, an infant or small child can be positioned onto the seat cushion, 12, and against the seat back, 14, and secured in place by means of the seat belts, 32.

While this version of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. With respect to the above description then, it is to be realized that the optimum dimensional relationships for the parts of the invention, to include variations in size, material, shape, form, function, and manner of operation, assembly and use, are deemed readily apparent and obvious to one skilled in the art, and all equivalent relationships to those illustrated in the drawings and described in the specification are intended to be encompassed by the present invention.

While the preferred form of the invention has been disclosed above, alternative methods of practicing the invention are readily apparent to the skilled practitioner. The above description of the preferred embodiment is intended to be illustrative only and not to limit the scope of the invention.

I claim:

1. A releasably attachable seat for a baby stroller, the stroller having a frame comprising a substantially horizontal frame member and an upwardly angled push handle, the seat comprising:
   (a) a seat cushion adapted to be releasably attached to the horizontal frame member; and
   (b) a seat back adapted to be releasably attached to the push handle.

2. The releasably attachable seat of claim 1 further comprising two arm rests, each adapted to be releasably attached to the stroller.

3. The releasably attachable seat of claim 1 wherein at least one of said seat cushion and said seat back comprises at least two separate cushions interconnected by flexible sheet material.

4. The releasably attachable seat of claim 1 wherein said seat cushion is adapted to bear at least partially on the upper surface of the horizontal frame member.

5. The releasably attachable seat of claim 4 wherein said seat back is adapted to bear at least partially on the front surface of the push handle.

6. The releasably attachable seat of claim 1 further comprising a footrest adapted to be releasably attached to the stroller frame.

7. A releasably attachable seat for a baby stroller, the stroller having a frame comprising a substantially horizontal frame member having an upper surface and an upwardly angled push handle having a front surface, the seat comprising:
   (a) a seat cushion adapted to bear at least partially on the upper surface of the horizontal frame member;
   (b) a seat back adapted to bear at least partially on the front surface of the push handle;
   (c) means for releasably attaching said seat cushion to the stroller frame; and
   (d) means for releasably attaching said seat back to the stroller frame.

8. The releasably attachable seat of claim 7 further comprising two arm rests, each adapted to be releasably attached to the stroller.

9. The releasably attachable seat of claim 8 wherein at least one of said seat cushion and said seat back comprises at least two separate cushions interconnected by flexible sheet material.

10. The releasably attachable seat of claim 8 further comprising a footrest adapted to be releasably attached to the stroller frame.

* * * * *